Feb. 10, 1959 W. W. KENNEDY 2,872,859
AIR DISTRIBUTION UNIT
Filed March 2, 1954

INVENTOR.
Walter W. Kennedy
BY
Carlson, Pitzner, Hurrand & Wolfe
ATTORNEYS

United States Patent Office 2,872,859
Patented Feb. 10, 1959

2,872,859

AIR DISTRIBUTION UNIT

Walter W. Kennedy, Rockford, Ill., assignor to Barber-Colman Company, Rockford, Ill., a corporation of Illinois Application March 2, 1954, Serial No. 413,551

6 Claims. (Cl. 98—38)

This invention relates to air distribution units of the type in which the air is discharged in a predetermined pattern and in which fresh air directed through one passage of the unit induces a flow of room air in the reverse direction along a return passage and causes the aspirated air to be mixed with the incoming fresh air. More particularly, the invention has reference to an air distribution unit in which the air is discharged at a comparatively low pressure but the incoming fresh air is delivered to a relatively high pressure.

The general object of the invention is to provide a new and improved air distribution unit of the above character in which the incoming high pressure air is utilized to create a Venturi action and thereby increase the aspirating effect of the unit.

A more detailed object is to provide a novel means for reducing the pressure of the incoming air and to dispose this means within the unit in such a manner as to produce the Venturi action.

Another object is to arrange the inlet for the incoming air in a novel manner to increase the mixing of the room air with the fresh air and to effect such mixing without substantial turbulence.

Figure 1:
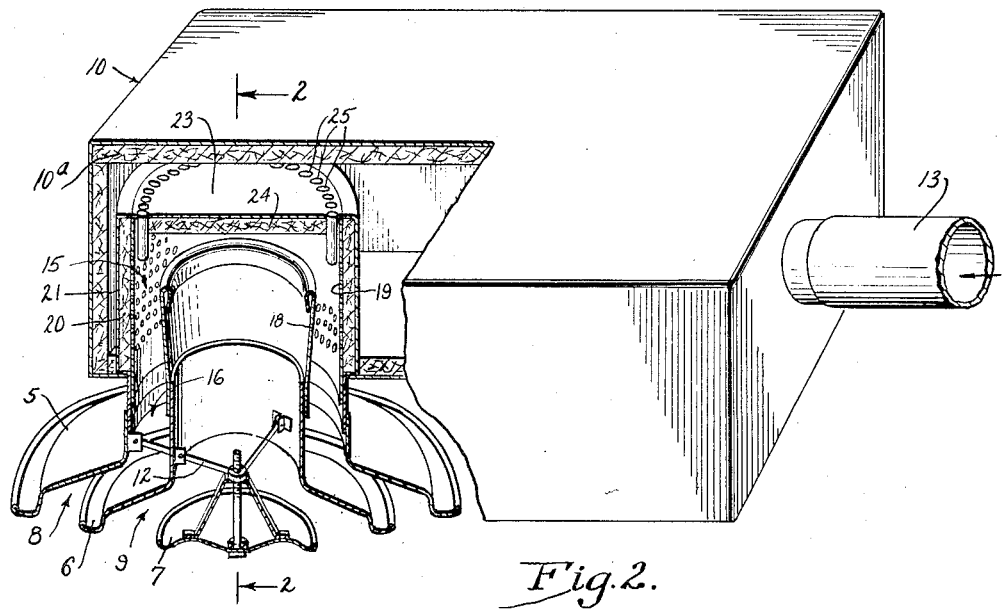

Other objects and advantages of the invention will become apparent from the following detailed description taken in connection with the accompanying drawings, in which Fig. 1 is an isometric view of an air distribution unit embodying the novel features of the present invention, parts being broken away and shown in section.

Figure 2:
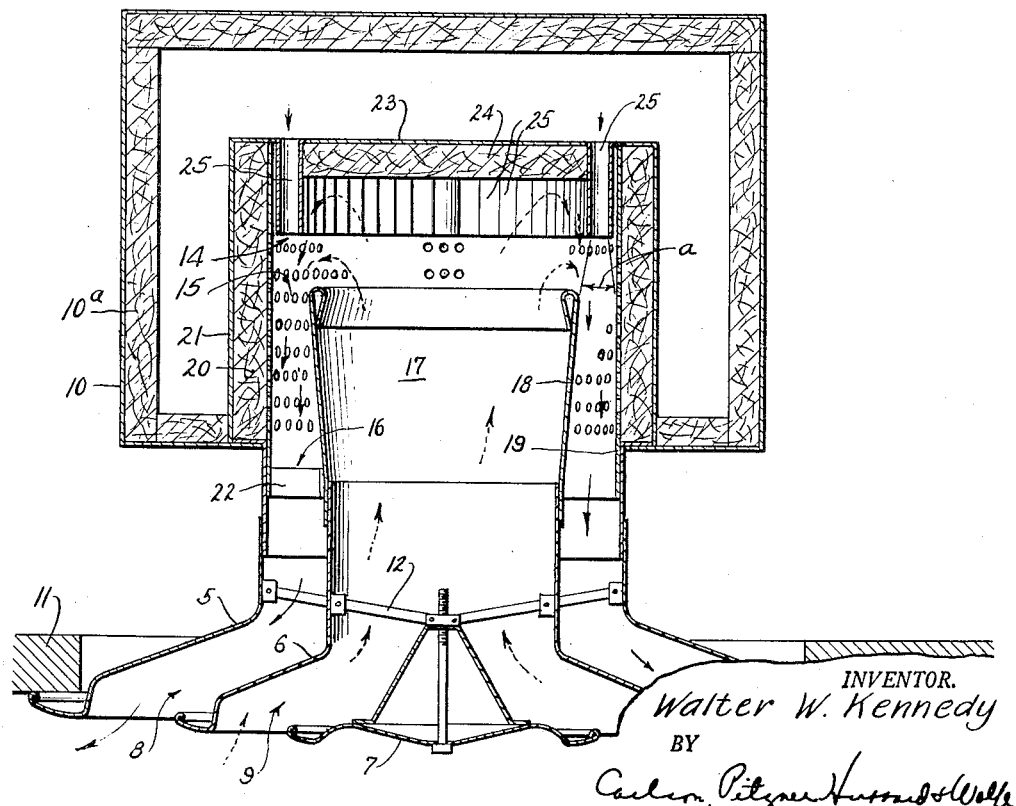

Fig. 2 is an enlarged sectional view taken along the line 2—2 in Fig. 1.

While the invention is applicable to air distribution units of various shapes, it is particularly suitable for use in conjunction with a ceiling outlet comprising outer, intermediate and inner conical deflectors 5, 6 and 7 concentrically disposed along the axis of the outlet and spaced apart to define laterally flaring concentric air passages 8 and 9. The outer deflector 5 is stationarily mounted on a box 10 lined with sound proofing acoustical material 10a and normally disposed behind a wall 11 (Fig. 2) of the room in which air is to be distributed. The intermediate and inner deflectors 6 and 7 are pivotally suspended at radially spaced points from a plurality of bars 12 radiating from the axis of the outlet. At their outer ends, the bars are pivotally connected to the outer deflector so that by tilting the bars, the deflectors may be moved differentially in the axial direction with a corresponding change in the widths of the passages 8 and 9.

Air at a relatively high pressure, that is, above one-half inch of water, is delivered to the box 10 through an inlet pipe 13. The incoming fresh air is directed through the passage 8 and this induces a reverse flow of room air through the passage 9. The aspirated room air mixes with the fresh air and the air mixture is discharged laterally from the passage 8 at a relatively low pressure such as one-sixteenth of an inch of water.

According to the present invention, the high pressure fresh air is utilized in a novel manner to create a Venturi action which increases the aspirating effect of the outlet so that a comparatively large flow of room air is drawn in through the return passage 9 and this room air is mixed throughly with the fresh air. For this purpose, the invention contemplates disposing within the outlet a means for reducing the pressure of the incoming fresh air and arranging this means to create the Venturi action. This pressure reducing means comprises an annular inlet nozzle 14 directing the high pressure air into the reduced section 15 of a flaring annular passage 16 which is concentric with the axis of the outlet and merges with the outlet passage 8. Thus, the fresh air directed into the Venturi-like passage 16 at a high pressure and velocity induces a reverse flow of room air through the return passage 8 and along the axis of the outlet through a passage 17 which is disposed within the annular Venturi passage and forms a continuation of the return passage. The direction of flow of the aspirated room air is reversed at the inlet end of the air distribution unit and flows alongside the nozzle 14 to mix with the fresh air as the latter issues from the nozzle. The mixture of fresh air and room air enters the reduced section 15 and flows along the Venturi passage and, as it flows along this passage, the mixture expands until its pressure is reduced to a magnitude on the order of one-sixteenth of an inch of water when the air is discharged laterally through the outlet passage 8.

In the present instance, the Venturi-like passage 16 is formed by concentric inner and outer tubular members 18 and 19 disposed behind the deflectors 5, 6 and 7 and alined with the intermediate and outer deflectors respectively so that the inner tubular member defines the return passage 17 while the two members together define the Venturi passage. The opposed surfaces of the tubular members converge toward their inlet ends to form the reduced section 15 and to give the passage 16 a cross section which gradually increases in width from the reduced section toward the outlet end. The length of the passage 16 is many times the width of the reduced section 15, being at least six times as long, to permit substantial reduction in pressure and velocity of the mixture of room air and fresh air before the latter is discharged through the passage 8.

The outer member 19 may, as illustrated in the drawings, be a tubular sheet metal casing of circular cross section secured to the box 10 and disposed concentrically with the axis of the outlet. At its lower end, the member or casing 19 merges with the outer deflector 5 to form, in effect, a continuation thereof and the other end projects into the box. Acoustical material 20 is wrapped around the portion of the casing within the box and is held in place by a cylindrical shell 21 encircling the casing. The casing 19 is perforated to permit sound waves to enter the acoustical material and traps the sound waves to effect a reduction of noise.

The inner member 18 is a sheet metal tube smaller than and disposed concentrically within the casing 19 so that the outer surface of the tube and the inner surface of the casing oppose each other and cooperate to define the Venturi passage 16. Toward its inner end, the tube 18 gradually increases in diameter to converge with the casing and form the reduced section 15 of the passage. The inner end of the tube, which is bent over inwardly to provide a rounded edge, is axially spaced a substantial distance from the inlet end of the casing 19. At its lower end, the tube is stationarily supported by radial brackets 22 secured to the casing and telescopes with the intermediate deflector 6 to form an effective continuation of the latter while permitting this deflector to slide axially for adjustment of the passages 8 and 9.

To admit the incoming air from the box 10 and direct this air toward the reduced section 15 of the passage 16, a wall 23, herein a circular plate covered on its inner side with acoustical material 24, covers the inlet end of the casing 19 and the nozzle 14 extends through the peripheral portion of the plate and projects down to a point over the Venturi passage 16 where the air is directed properly into the reduced inlet end of the passage. The point of discharge is located so that all of the air leaving the nozzle enters the passage 16, that is, the angle $a$ (Fig. 2) defined by the opposite sides of the reduced section 15 and the lower tip of the nozzle is greater than 14 degrees which is the angle at which the air expands. Preferably, the nozzle 14 is formed by a series of small nozzles or short tubes 25 circumferentially spaced around the plate and projecting through the plate and down to the point of discharge.

By employing a plurality of tubes 25, the incoming air is divided into many streams and this increases the surface area of the air as it leaves the tubes. This increased surface area provides greater contact between the incoming air and the aspirated room air, which enters between the tubes 25 and flows down along all sides of the streams of incoming air, so that a thorough and efficient mixing is achieved.

In operation, air under pressure is admitted to the box 10 from the pipe 13 and flows down through the tubes 25. The air discharged from the tubes enters the reduced section 15 of the passage 16 as indicated by the full line arrows in Fig. 2 and expands as it flows down through this passage. This flow of air creates a negative pressure area adjacent the outlets of the tubes 25 so as to induce a flow of room air up through the tubular member 18 as indicated by the broken line arrows. Because of the substantial distance between the inner end of the tubular member and the plate 23, the aspirated room air gradually reverses its direction of flow in the space just below the plate and flows down alongside the tubes 25 so that it is moving in the same general direction as the incoming air. As a result, the room air mixes smoothly with the fresh air thus avoiding turbulence and increasing the effective aspirating action of the outlet. The room air enters between the tubes 25 and surrounds the streams of incoming air thus contacting the incoming air streams at all points around the latter and mixing thoroughly with the incoming air.

After being mixed, the incoming air and the aspirated room air flow downwardly through the passage 16 and then are deflected laterally through the passage 8. Since the lengths of the casing 19 and the tube 18 are such that the length of the passage 16 is many times the width of the reduced portion 15, the air expands substantially before it reaches the outlet end of the passage 16. Because of this expansion, the air is flowing at a comparatively low velocity when it is deflected laterally through the passage 8 and thus the stream of air not only is discharged at a low pressure but also is turned efficiently.

The incoming air is at a different temperature than the room air but the temperature differential between the room air and the air leaving the passage 8 is reduced due to the mixing of the aspirated air with the incoming air. By adjusting the deflector 7 to vary the size of the return passage 9, the amount of aspirated air mixed with the incoming air is controlled to vary the temperature of the discharged air mixture. Thus, the deflector 7 is, in effect, a damper controlling the amount of room air aspirated and hence the temperature of the air discharged into the room. Any adjusting device such as is well known in the art may be utilized for this purpose.

I claim as my invention:

1. A combined pressure reducer and distributor unit for high pressure air in an air conditioning system having, in combination, means defining a supply chamber for receiving air at high pressure, an outer tubular wall having one end portion projecting into said chamber, an inner tubular wall smaller than said outer wall and disposed within the latter whereby the two walls coact to define an elongated tubular passage, said one end of the outer wall projecting a substantial distance beyond the adjacent end of the inner wall and said two walls diverging gradually away from each other substantially throughout their lengths to form a Venturi passage having an inlet restriction adjacent the aforementioned end of the inner wall, means supporting said inner tubular wall in said outer tubular wall, two discharge members, one connected to the other end of each of said walls and flaring outwardly to deliver air from said passage in an expanding pattern, a partition closing said one end of said outer wall to separate the interior of the unit from said chamber and form with said outer wall an aspirating and mixing space beyond the inlet restriction of said Venturi passage, said inner wall defining a passage for the return flow of room air inwardly therethrough into said space, and a series of nozzles angularly spaced around and adjacent said outer wall and defining passages extending through said partition to points spaced beyond the partition but short of said restricted inlet, said nozzles being shaped to convert the high pressure air flowing therethrough into jet-like streams directed into said inlet longitudinally of said Venturi passage whereby to induce the air in said aspirating space to flow along the exterior of said nozzles and into contact with each stream around the entire periphery of the latter as the streams enter said Venturi inlet.

2. An air distribution unit having, in combination, means defining a supply chamber for receiving air at high pressure, an outer tubular wall having one end portion projecting into said chamber, an inner tubular wall smaller than said outer wall and disposed within the latter whereby the two walls coact to define an elongated tubular passage, said one end of the outer wall projecting a substantial distance beyond the adjacent end of the inner wall and said two walls diverging gradually away from each other substantially throughout their lengths to form a Venturi passage having an inlet restriction adjacent the aforementioned end of the inner wall, means supporting said inner tubular wall in said outer tubular wall, two discharge members, one connected to the other end of each of said walls and flaring outwardly to deliver air from said passage in an expanding pattern, a partition closing said one end of said outer wall to separate the interior of the unit from said chamber and form with said outer wall an aspirating and mixing space beyond the inlet restriction of said Venturi passage, said inner wall defining a passage for the return flow of room air inwardly therethrough into said space, and a nozzle adjacent said outer wall defining an annular passage extending through said partition to a point spaced beyond the partition but short of said restricted inlet, said nozzle being shaped to convert the high pressure air flowing therethrough into a jet-like stream directed into said inlet longitudinally of said Venturi passage whereby to induce the air in said aspirating space to flow along the exterior of said nozzle and into contact with said stream as the streams enter said Venturi inlet.

3. An air distribution unit comprising a tubular casing having an inlet end and outlet end, a wall covering said inlet end, a tubular member smaller than and disposed within said casing with its inner end axially spaced a substantial distance from said wall, the opposed surfaces of said casing and said member converging toward said inlet end to define a passage having a reduced section adjacent the inner end of said tube and increasing in cross sectional area toward said outlet end, means supporting said member in said casing, and a plurality of tubes projecting through said wall around the peripheral portion thereof and terminating adjacent said inner end to direct air into said reduced section and create a Venturi effect inducing a reverse flow of aspirated air through said tube, into the space between said inner end and said wall, reversely along said tubes at all points around the latter and into said passage.

4. An air distribution unit having, in combination, an outer tubular member having an inlet at one end and an outlet at the other end, a wall covering said inlet end, an inner tubular member disposed within said outer member concentric with the latter with one end axially spaced from said wall, said inner member increasing in diameter toward said one end to cooperate with said outer member in defining an annular passage having a reduced section adjacent said one end and increasing cross sectional area toward said outlet end, means supporting said inner member in said outer member, and a plurality of tubes opening through said wall and circumferentially spaced around the peripheral portion of said wall, said tubes terminating at a point between said wall and said reduced section to direct incoming air into the reduced section of said passage thereby to create a Venturi effect inducing a reverse flow of aspirated air through said inner member, around said one end between said tubes, along the tubes and into said passage.

5. An air distribution unit comprising a tubular member, a tubular casing encircling said member and having an outlet end and an inlet end extending beyond one end of the member, the outer surface of said member and the inner surface of said casing converging toward said inlet end to define a passage having a reduced section at said one end of the member and increasing in cross sectional area toward said outlet end, means supporting said member in said casing, a wall axially spaced from said one end and covering the inlet end of said casing, and an annular nozzle opening through said wall around the periphery and terminating at a point between said wall and said reduced portion to direct incoming air into the reduced portion of said passage and thereby to create a Venturi action inducing a reverse flow of aspirated air through said member, around said one end of the member, along said nozzle and into said passage.

6. An air distribution unit having, in combination, a tubular casing having an inlet at one end and an outlet at the other, a wall covering said inlet end, a tubular member smaller than said casing disposed within the casing with the end adjacent said inlet being axially spaced from said wall, the opposed surfaces of said casing and said member diverging toward said outlet end to define a passage increasing in cross sectional area and having a reduced cross section at the inner end of the member, means supporting said member in said casing, and an annular nozzle projecting through the peripheral portion of said wall and toward the reduced end of the passage to direct the flow of air through the wall and into said reduced end thereby to effect a Venturi action inducing a reverse flow of aspirated air through said member, around the inner end of the member and into said passage.

References Cited in the file of this patent

UNITED STATES PATENTS

| 988,157 | Wessinger | Mar. 28, 1911 |
| 2,199,525 | Kurth | May 7, 1940 |
| 2,684,024 | Kurth et al. | July 20, 1954 |
| 2,687,746 | Argentieri | Aug. 31, 1954 |

FOREIGN PATENTS

| 704,447 | Great Britain | Feb. 24, 1954 |